Jan. 15, 1963 G. A. SCHERNEKAU 3,073,341
WATER SOFTENER CONTROL
Filed Feb. 23, 1961 2 Sheets-Sheet 1
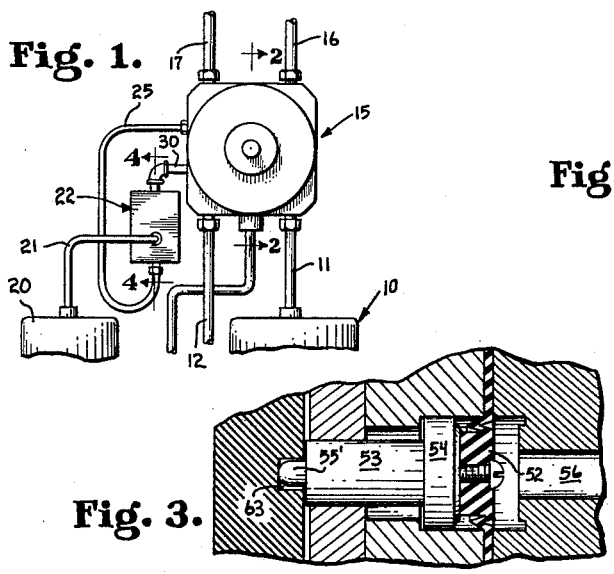
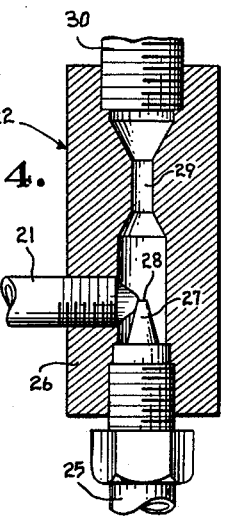
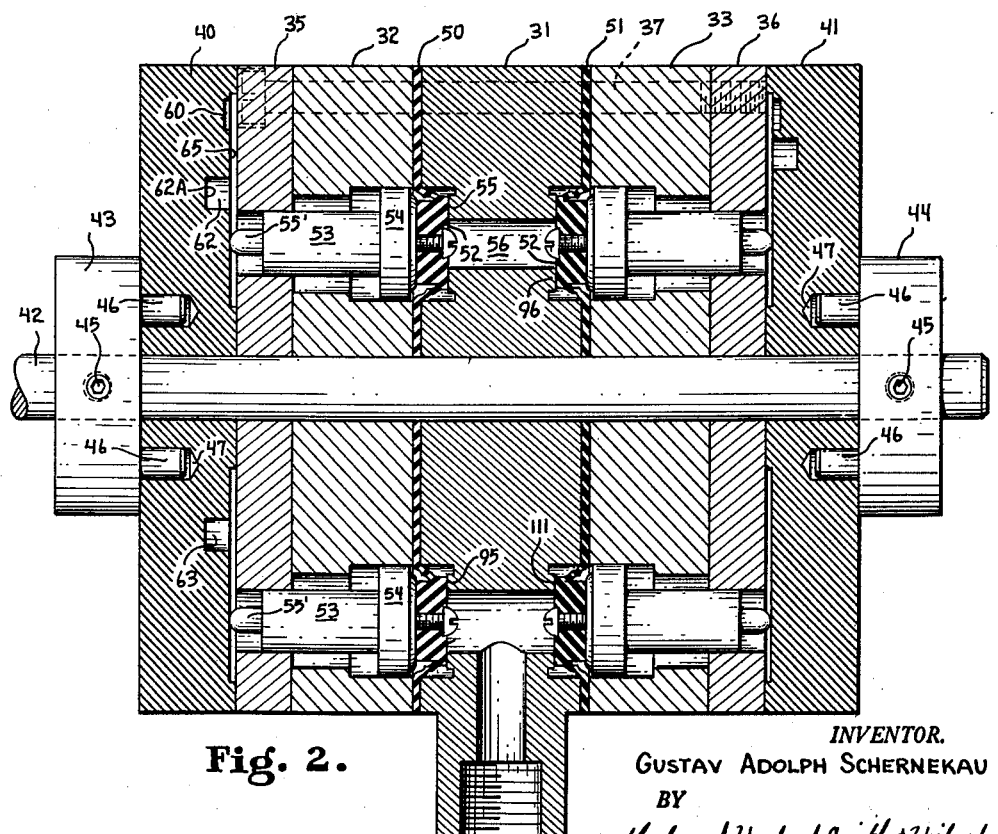
INVENTOR.
GUSTAV ADOLPH SCHERNEKAU
BY
Lockwood, Woodard, Smith & Weikart
Attorneys Jan. 15, 1963  G. A. SCHERNEKAU  3,073,341
WATER SOFTENER CONTROL Filed Feb. 23, 1961  2 Sheets-Sheet 2

INVENTOR.
GUSTAV ADOLPH SCHERNEKAU
BY
Lockwood, Woodard, Smith & Weikart
Attorneys

United States Patent Office 3,073,341
Patented Jan. 15, 1963

3,073,341
WATER SOFTENER CONTROL
Gustav Adolph Schernekau, Indianapolis, Ind., assignor of one-fourth to Paul G. Schernekau, one-fourth to Emil R. Schernekau, one-eighth to Robert E. Schernekau, and one-fourth to Merle J. Kline, all of Indianapolis, Ind.
Filed Feb. 23, 1961, Ser. No. 91,003
4 Claims. (Cl. 137—609)

The present invention relates to a control arrangement which finds an important utility as a control arrangement for a water softening system.

As is well known, water is softened by the use of a mineral in a tank through which the hard water is passed to remove the lime and magnesia therefrom. These elements are removed from the hard water by chemical exchange for an alkali in the mineral which in the exchange becomes charged or combines with the lime and magnesia. This process involves filtering the hard water through a deep bed of mineral prepared in the form of bead-like granules and enclosed in a suitable tank.

If the mineral has been overcharged with the lime and the magnesia, it loses its softening quality or capability and requires restoration or regeneration of the alkali which has been lost. For this purpose, a solution of common salt, sodium chloride, is used in the form of brine and is allowed to filter through the mineral bed after it has been backwashed to clean out impurities. The chlorine of the salt unites with the lime and magnesia to form a solution which must be flushed or washed out of the tank before softening of the hard water can be resumed. One of the objects of the present invention is to provide an automatic control valve arrangement for regenerating a water softening installation, that is, for backwashing, brining and flushing the installation.

Still another object of the present invention is to provide an improved automatic control arrangement usable in various applications, for example, in conducting acid and caustic materials from place to place.

Related objects will become apparent as the description proceeds.

One embodiment of the present invention might include a control provided with a central element having a plurality of passages therethrough, a pair of further elements having said central element sandwiched therebetween, gaskets received between said central element and said further elements, and valves formed in said gasket and reciprocably carried by said further elements, said valves being movable to close and open said passages.

The full nature of the invention will be understood from the accompanying drawings and the following description and claims:

FIG. 1 is a side elevation of a water softening installation including the improved automatic control of the present invention.

FIG. 2 is a vertical section taken along the line 2—2 of FIG. 1 in the direction of the arrows showing the control in the service position.

FIG. 3 is a section similar to FIG. 2 showing a single one of the valves thereof but showing that valve in expelled open position.

FIG. 4 is a vertical section taken along the line 4—4 of FIG. 1 in the direction of the arrows.

Figure 5:
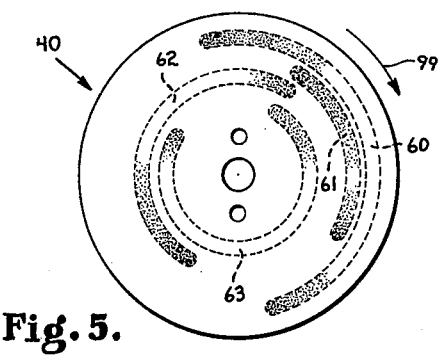
FIG. 5 is a side elevation of a cam wheel forming a part of the control of the present invention showing it in the service position as regards the other figs.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a water softening mineral tank 10 having a conduit 11 connected to the upper end thereof and a conduit 12 connected to the lower end thereof. Each of the conduits 11 and 12 is connected at its other end to a control 15 which has further conduits 16 and 17 connected thereto, the conduit 16 being adapted to receive hard water and the conduit 17 being the soft water outlet of the control and connected to the faucets. A conventional brine tank 20 is connected by means of conduit 21 to a venturi arrangement 22 which is shown in detail in FIG. 4.

A conduit 25 leads from the control 15 to the lower end of a block 26 forming part of the venturi arrangement and normally conducts water under pressure into an insert 27 which has a restricted outlet orifice 28. The flow of water from the orifice 28 into the conduit 29 in block 26 causes brine to be sucked from the brine tank 20 through the conduit 21, the mixture of water from the conduit 25 and the brine leaving the block 26 through outlet conduit 30 which is, in turn, connected to control 15. It should be mentioned that the brine tank is so constructed as to include a suitable check valve (not shown) which, in conventional manner, cuts off the flow of brine out of the brine tank through the conduit 21 after a predetermined amount of brine has so flowed and the brine level in the tank has dropped to a certain predetermined height. It should also be mentioned that the brine level in the tank can be raised by flowing fresh water through the conduit 25 into the block 26 and by cutting off the flow through the conduit 30 whereby the fresh water passes through the conduit 21 into the brine tank. The brine tank will, of course, contain an excess amount of salt which cannot all pass into solution at one time.

Referring to FIG. 2, the control 15 is shown in section and includes a central element 31 sandwiched between a pair of intermediate elements 32 and 33 which are, in turn, sandwiched between cover plates 35 and 36. The various parts 31, 32, 33, 35 and 36 are secured together by means of a plurality of screws such as the screws 37 which are received in the various apertures 39 and thread into the cover plate 36. At the opposite ends of the control are located cam wheels 40 and 41 which are rotated together by means of a suitable motor through a shaft 42 having collars 43 and 44 secured thereto by means of suitable setscrews 45. Each of the collars has a pair of inwardly projecting tits 46 which are received in recesses 47 and rotate the cam wheels about the axis of the shaft 42.

Received between the central element 31 and the intermediate elements 32 and 33 are a pair of flexible gaskets 50 and 51, respectively. Each of the gaskets are formed of resilient, rubber-like material and have formed therein a plurality of valve closure portions 52, each of which is associated with a particular valve piston made up of a slidable cylindrical element 53 having an enlarged cylindrical portion 54 at one end and a lesser diameter rounded protuberance 55' at the other end. The various valve closure elements 52 are secured by means of suitable screws to the enlarged cylindrical portions 54.

Each of the closure portions 52 is adapted to engage a valve seat such as the seat 55 to close off flow through a passage such as the passage 56. The valve is moved to such a closed position by the rotation of the cam wheel 40 which has a plurality of circular cam tracks 60—63. The cam tracks vary in depth from the depth of the shallow recess 65 which forms a part of those tracks to the deep portion 62A of the track 62 as illustrated in the upper portion of FIG. 2.

When the cam wheel is at such a position that the depth of the track adjacent thereto is as at 65, the valve will be projected as are all of the valves in FIG. 2 to close off the respective valve seat of that valve. When the depth of the cam track adjacent a valve is as illustrated in FIG. 3, the particular valve will be moved away from its valve seat by the water pressure within element 31 and the closure portion 52 thereof will fold in an accordion-like manner into general alignment with the remainder of the gasket. This opening action will be produced by the pressure of liquid within the passage 56.

It should be noted that the depth of the cam tracks 60—63 varies smoothly from their deepest portion to their shallowest portion. The cam wheel 41 is provided with a similar set of cam tracks 66—69 which control similar valves in elements 33 and 36. The depth of all of the cam tracks is indicated by the shading in FIGS. 5 and 8, the deepest portion being unshaded but within the dotted lines. The shading indicates the smooth variation from the deep to the shallow portions.

The various passages of the control will be described in connection with a description of the operation of the device. Assume that the cam wheels are stationary and the apparatus is operating a normal service position, that is operating on hard water supplied by the conduit 16 and delivering it in softened form to the conduit 17. The cam wheels 40 and 41 will be positioned as in FIGS. 5 and 8, that is, the portions of the cam wheels shown up will be up. The water passes from the conduit 16 into a passage 70 which opens into a valve seat 71. This valve seat is provided with a valve similar to the various valves illustrated in FIGS. 2 and 3, said valve being closed when the control is in the service position. As has been explained above, the cam wheels are provided with the cam tracks 60—63 and 66—69. As can be seen from a comparison of FIGS. 5 and 7, the outermost cam track 60 of the cam wheel 40 is so formed that its valve will be projected, closing the valve seat 71 when the control is in the service position and therefore, there will be no flow through this valve seat.

Figure 7:
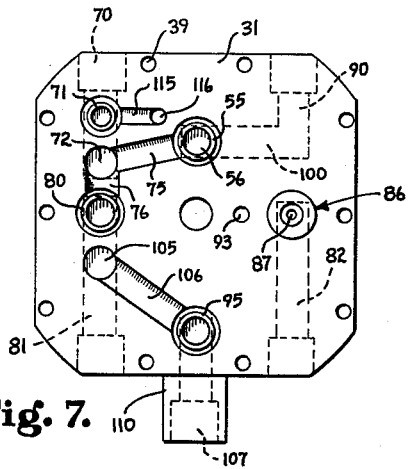
FIG. 7 is a side elevation of a central element forming a part of the control of the present invention.
Figure 10:
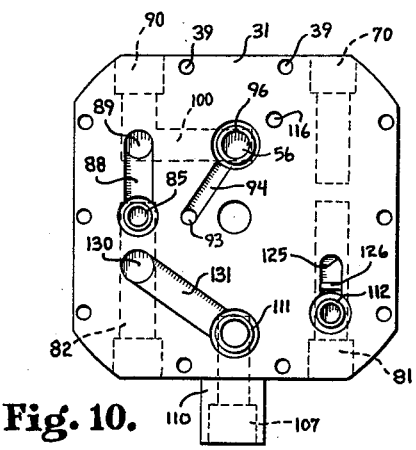
FIG. 10 is a side elevation of the central element of FIG. 7 showing the opposite side thereof from that shown in FIG. 7.

The passage 70 leads downwardly past the valve seat 71 to a horizontally extending portion 72 which opens on the face of the central element 31 shown in FIG. 7. The element 31 has formed in its face a pair of indentations 75 and 76 which lead to valve seats 55 and 80, respectively. When the device is in the service position, valve seat 55 is closed. However, the valve seat 80 is open and the hard water from the inlet passage 70 passes through the portion 72 and indentation 76 through the valve seat 80 into the interior of the element 31 to a passage 81 which extends downwardly and communicates with the conduit 11 (FIG. 1). The water passing through the conduit 11, of course, moves into the top of the mineral tank. It will be obvious that the valve seat 80 is provided with a valve similar to those illustrated in FIGS. 3 and 5. Because the cam track 62 controls this valve, it can be seen from FIGS. 5 and 7 that valve seat 80 will be open in the service position.

The hard water passing into the top of the mineral tank moves through the mineral in the tank, is softened and passes from the bottom of the tank in a softened condition into the conduit 12 which leads to passage 82 in the element 31. The passage 82 leads upwardly to a valve seat 85 and to an annular flow control element 86 having a restricted orifice 87 therethrough. In the service position of the control, the valve seat 85 is open by reason of the cam track 68 to permit the flow of soft water therethrough.

After passing through the valve seat 85 which, of course, is provided with a closure assembly similar to those illustrated in FIGS. 3 and 4, the water passes through an indentation 88 in the face of the element 31 and back into the interior of the element through a portion 89 of outlet passage 90. Water does not move from the passage 82 through the flow control element 86 because of the fact that the valve seat 96 is closed by its respective valve. It will be noted that the passages 91 and 92 in element 32, the passage 93 in element 31 and the indentation 94 lead into the valve seat 96.

Figure 8:
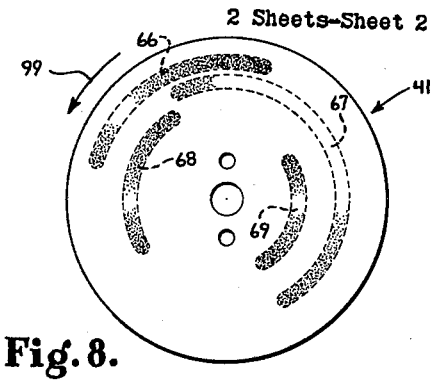
FIG. 8 is a side elevation of still a further cam wheel of the present invention showing it in the service position.
Figure 6:
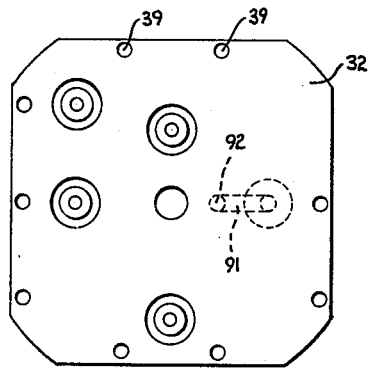
FIG. 6 is a side elevation of an intermediate element forming a part of the control of the present invention.
Figure 9:
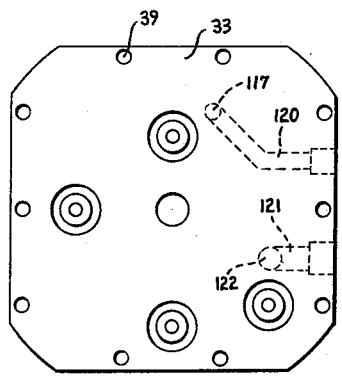
FIG. 9 is a side elevation of a further intermediate element forming a part of the control of the present invention.

When it is desired to regenerate the apparatus, the motor connected to the shaft 42 is actuated to index the shaft 42 ninety degrees or through a quarter rotation in the direction of arrows 99 (FIGS. 5 and 8). This indexing may be accomplished in any suitable automatic manner or by push button operation of the motor if desired. The rotation of the shaft 42 causes the cam wheels 40 and 41 to also be indexed through a quarter rotation and to cause appropriate changes in the positions of the various valves by reason of the fact that the cam tracks of the cam wheels are repositioned with relation to the protuberances 55'. When the control is in this second ninety degree position, which is called the backwash position, the valves associated with the valve seats 55, 95, and 96 are open, the cam tracks 63, 61 and 69, respectively, being positioned to permit such opening and the remaining valve seats are closed.

The hard water which is flowing into the passage 70 from the conduit 16 can no longer pass through the valve seat 80 which is now closed by its valve and cam track 62 but can pass downwardly through passage 70 into the portion 72 and into the indentation 75. As mentioned, this indentation leads to the valve seat 55 which is now open and the hard water passes through passage 56 into a passage 100 which leads into the passage 90 whereby water is supplied to the outlet 17. It can be appreciated that this water has not been softened and that therefore, hard water is being supplied to the faucets. This condition, however, is a temporary one which is present only during the regeneration cycle and it is conceivable that there will be no need for water at this time. If there is such a need, however, at least hard water is available.

As mentioned, the valve seat 96 is open and therefore, the water flowing into the passage 56 also flows through the valve seat 96 and into the indentations 94, passages 93, 92 and 91, in order, to the annular flow control element 86. The water moves through the restricted orifice 87 in the flow control element and passes into the passage 82 from whence it moves into the conduit 12 to the bottom of the mineral tank. It can be appreciated that the flow of water through the conduit 12 will cause a "backwash" effect in the mineral tank because the water is flowing in an opposite direction to the normal flow during the service period. This backwashing operation agitates the minerals and cleans out impurities which have collected in the mineral tank.

The water continues its upward flow into the conduit 11 and moves into the passage 81. Since the valve seat 80 is closed, flow is cut off in this direction. However, the water with its impurities passes from the interior of the central element 31 through the passage 105 and into the indentation 106 in the face of the element 31. The valve seat 95 is open in the manner explained above and the water and impurities flow through the valve seat 95 into a discharge passage 107 extending through a discharge projection 110, the discharge passage being connected in any desired manner to a suitable drain.

After the backwashing cycle has continued for an appropriate period of time, the motor connected to the shaft 42 is then actuated to index the shaft 42 a further ninety degrees in the same direction as indicated by arrows 99. As suggested above, the rotation of the shaft causes the cam wheels to be indexed through one-quarter rotation and to produce appropriate changes in the positions of the various valves. When the device is in this third position, which may be termed the brining and slow flush position, brine is allowed to filter through the mineral bed in order to replace the sodium ion in the mineral and the chlorine of the salt unites with the lime and magnesia to form a solution which must be flushed from the tank. When the control is in this third position, the valve seats 71, 55, 111 and 112 are open, the cam tracks 60, 63, 67 and 66, respectively, being positioned to permit such opening and the remaining valve seats are closed.

Hard water continues to flow through the passage 70, portion 72 and indentation 75 through the valve seat 55 into the passages 56, 100 and 90 to the faucets. Thus, the flow of water to the faucets is uninterrupted. Water cannot flow from the passage 56 into the indentation 94 by reason of the fact that the valve seat 96 is closed. The valve seat 71 is open and permits flow of water through that valve into the indentation 115 in the face of the central element and into the passage 116 also in the element 31. The passage 116 is in registry with the conduit 117 in the intermediate element 33, said conduit 117 being in communication with a further passage 120 leading to the exterior of the device.

Referring to FIG. 1, the conduit 25 is seated within the counterbore at the opening of the passage 120 and thus, the water flows into the conduit 25 and to the venturi arrangement 22. As has been explained above, the flow of water through the venturi arrangement causes brine to be drawn from the brine tank and through the conduit 21 into the passage 29 in the block 26 where the brine and water mix prior to flowing into conduit 30.

The conduit 30 is seated within a counterbore at the opening of a passage 121 in the intermediate element 33. Thus, the brine mixture flows into the passage 121 and a passage 122 communicating therewith and in registry with a passage 125 in the central element 31, said passage leading to the valve seat 112. It should be noted that a small rigid rib 126 is formed between the inlet of the passage 125 and the valve seat in order to insure that there is no leakage through the valve seat when the valve seat is closed by its respective valve. The brine solution flows through the valve seat 112 and into the passage 81, thence to the top of the mineral tank through the conduit 11 to produce the brining action upon the mineral.

As explained above, the brining action restores the mineral and produces waste salts which move with the water from the bottom of the tank and through the conduit 12 into the passage 82. Because of the fact that valve seat 96 is closed, the water does not pass through the flow control element 86. Furthermore, the valve seat 85 is closed by its respective valve. As mentioned above, the valve seat 111 is open and therefore, the water and waste salt from the mineral tank flow through the passage 130 into indentation 131 through the valve seat 111 and downwardly through the passage 107 in the discharge element 110 to the drain.

After this brining operation has continued for a period of time, the flow of brine from the brine tank through the conduit 21 will cease by reason of the fact that the brine in the tank will fall to a sufficiently low level that a check valve operates to prevent air from passing into the conduit 21. When the conduit 21 is so closed off, the flow of water through the venturi block 26 does not add any further brine to the water passing into the control through the conduit 25. This cycle continues, however, as a flushing operation. In other words, the water passes through the mineral tank from top to bottom, back to the control and to the drain removing the undesired waste salt from the mineral tank and from the system. It should be noted that the size of the various passages and conduits through which the water passes causes the amount of water actually moving through the mineral tank to be a relatively small amount which is, of course, the reason why this portion of the cycle is termed "slow" flush.

The motor is again actuated to rotate the shaft in the same direction, indicated by arrows 99, a further ninety degrees, moving the apparatus into the fast flush and brine refill position. In this position, the valve seats 71, 80, 55 and 111 are open, the cam tracks 60, 62, 63 and 67 being positioned to permit such opening and the remaining valve seats are closed. The provision of water to the faucets is continued by reason of open valve seat 55. In similar fashion to the brining and slow flush operation, water flows into the passage 115 through the valve seat 71 and moves into the passages 116, 117 and 120. From the passage 120, the water flows into the conduit 25 and into the venturi block 26. Because flow is cut off through the conduit 30 in a manner to be explained below, the water from the conduit 25 flows through the conduit 21 into the brine tank to produce a further amount of brine solution in the tank.

Tracing the previous path of the water from the venturi block 26, it can be appreciated that water previously was flowing from the conduit 30, passages 121, 122 and 125 through the valve seat 112. As mentioned, however, the valve seat 112 is now closed by its valve and for this reason, flow through the conduit 30 is cut off.

The major portion of the water in the passage 70 will flow out of the portion 72 and through the valve seat 80 into the passage 81 and from there into the top of the tank. This water will then flow through the tank producing a fast flushing effect and will carry the remaining waste salts produced by the brining operation through the conduit 12 and passages 82 and 130 and indentation 131 into the valve seat 111 and from there out of the discharge 110 to drain. It will be understood that because of the relatively large size or cross section of the passages comprising the circuit through the mineral tank when the control is in the fast flush position, a relatively large amount of water will be allowed to flow through the mineral tank to produce the above described "fast" flush. After the backwash, brining and slow flush, fast flush and rebrining operations have been completed, the motor is again indexed in the direction of arrows 99 through ninety degrees returning the control structure to the service position. The service cycle, which has been described above, is then repeated but regenerated mineral has now been provided.

From the above description, it can be appreciated that the present invention provides an improved control arrangement for a water softener regeneration system. It should be emphasized that the present arrangement eliminates solenoids, springs and other complicated structure usually thought to be necessary in a control valve arrangement and replaces them with a circular cam track arrangement for closing the valves and liquid pressure for opening the valves. Furthermore, the ease with which the circular cam track arrangement can be programmed will also be evident.

It should also be mentioned that the present invention may also find use in controlling flow of corrosive liquids because the particular structure of the invention permits an arrangement wherein no metal is contacted by the liquids. Referring to FIG. 2, it is preferred to construct the elements 31—33 of plastic and the screws securing the portions 52 in place can easily be replaced by other securing means or by screws which are not subject to corrosion.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A control comprising a central element having a plurality of passages therethrough, a pair of further elements having said central element therebetween, gaskets received between said central element and said further elements and covering the openings of said passages, and valves reciprocably carried by said further elements, said valves including closure portions formed in said gaskets, said central element having indentations joining said passages at their openings, said valves being reciprocal upon said further elements to positions wherein the closure portions of said valves engage the portions of said central element surrounding said passage openings to close and open the openings of said passages to cut off flow between said indentations and passages, and a pair of cam wheels rotatably mounted about an axis on the outside of said elements with said elements therebetween, each cam wheel having a plurality of circular cam tracks engaging said valves, said cam tracks facing inwardly, having varying depth along their length and being concentric with the axis of rotation of said cam wheels whereby rotation of said cam wheels moves said valves.

2. A control comprising a central element having a plurality of passages therethrough, a pair of further elements having said central element therebetween, gaskets received between said central element and said further elements and covering the openings of said passages, and valves reciprocably carried by said further elements, said valves including closure portions formed in said gaskets, said central element having indentations joining said passages at their openings, said valves being reciprocal upon said further elements to positions wherein the closure portions of said valves engage the portions of said central element surrounding said passage openings to close and open the openings of said passages to cut off flow between said indentations and passages, a pair of cam wheels rotatably mounted about an axis on the outside of said elements with said elements therebetween, each cam wheel having a plurality of circular cam tracks engaging said valves, said cam tracks facing inwardly, having varying depth along their length and being concentric with the axis of rotation of said cam wheels whereby rotation of said cam wheels moves said valves, and means for supplying liquid under pressure to said passages to force said valves to open said passages when said valves are not held closed by said cam tracks.

3. A control comprising a central element having a plurality of passages therethrough, a pair of further elements having said central element therebetween, gaskets received between said central element and said further elements and covering the openings of said passages, and valves reciprocably carried by said further elements, said valves including closure portions formed in said gaskets, said closure portions being sized to seat against said central element to close said passage openings, said central element having indentations joining said passages at their openings, and a pair of cam wheels rotatably mounted on the outside of said elements with said elements therebetween, each cam wheel having concentric circular cam surfaces engaging said valves, said cam surfaces having certain portions which extend inwardly to a greater extent than other portions thereof whereby rotation of said cam wheels causes said certain portions of said cam surfaces to move said valves and closure portions inwardly to close said passage openings.

4. A control comprising a first element having a plurality of passages therein, a further element fixed to said first element, a gasket received between said elements, a plurality of valves each including a valve stem reciprocably mounted on said further element, said valves each further including a closure portion formed in said gasket and fixed to said valve stem, said first element having indentations therein which are between said gasket and first element and lead into said passages, each of said valves being reciprocal on said further element to a position wherein said closure portion engages said first element at a respective juncture of one of said indentations and one of said passages to close off communication therebetween, a cam wheel rotatably mounted on said elements about an axis and having a plurality of circular cam tracks concentric about said axis, said cam tracks engaging said valve stems and each having varying depth along its length whereby rotation of said cam wheel moves each of said valves to said position.

References Cited in the file of this patent

UNITED STATES PATENTS

| 929,367 | Anderson | July 27, 1909 |
| 1,939,911 | McCune | Dec. 19, 1933 |
| 2,721,578 | Pouppirt | Oct. 25, 1955 |

FOREIGN PATENTS

| 489,794 | Italy | of 1954 |